(12) United States Patent
Zhang et al.

(10) Patent No.: US 11,685,966 B2
(45) Date of Patent: Jun. 27, 2023

(54) METHODS FOR PRODUCING 2024 AND 7075 ALUMINUM ALLOYS BY RECYCLING WASTE AIRCRAFT ALUMINUM ALLOYS

(71) Applicants: UNIVERSITY OF SCIENCE AND TECHNOLOGY BEIJING, Beijing (CN); BOEING (CHINA) CO., LTD., Beijing (CN)

(72) Inventors: Shengen Zhang, Beijing (CN); Bo Liu, Beijing (CN); Rui Lin, Beijing (CN)

(73) Assignee: The Boeing Company, Arlington, VA (US)

( * ) Notice: Subject to any disclaimer, the term of this patent is extended or adjusted under 35 U.S.C. 154(b) by 535 days.

(21) Appl. No.: 16/634,909

(22) PCT Filed: Sep. 19, 2018

(86) PCT No.: PCT/CN2018/106424
§ 371 (c)(1),
(2) Date: Jan. 29, 2020

(87) PCT Pub. No.: WO2019/057057
PCT Pub. Date: Mar. 28, 2019

(65) Prior Publication Data
US 2021/0095360 A1    Apr. 1, 2021

(30) Foreign Application Priority Data

Sep. 20, 2017    (CN) .......................... 201710855471.4

(51) Int. Cl.
*C22C 1/02*    (2006.01)
*B22C 9/08*    (2006.01)
(Continued)

(52) U.S. Cl.
CPC .............. *C22C 1/026* (2013.01); *B22C 9/086* (2013.01); *B22D 21/007* (2013.01); *B22D 43/00* (2013.01);
(Continued)

(58) Field of Classification Search
None
See application file for complete search history.

(56) References Cited

U.S. PATENT DOCUMENTS 4,365,993 A  * 12/1982  Meredith ............ C22B 21/0007
                                                       75/416
6,293,990 B1    9/2001  Verdier et al.
(Continued)

FOREIGN PATENT DOCUMENTS

AU    2008229963 B1    3/2010
CA        229113 A      2/1923
(Continued)

OTHER PUBLICATIONS

Innovation, Science and Economic Development Canada, Office Action for Application 3,071,708 dated Nov. 29, 2021.
(Continued)

*Primary Examiner* — Scott R Kastler
(74) *Attorney, Agent, or Firm* — Patterson + Sherdan, LLP

(57) ABSTRACT

The present invention relates to techniques for producing 2024 and 7075 aluminum alloys by recycling waste aircraft aluminum alloys, which belong to technical fields for circular economy. The present invention develops techniques for obtaining the 2024 and 7075 aluminum alloys by subjecting waste aircraft aluminum alloys as raw materials to pretreatment, smelting, impurity removal, melt ingredient assay, ingredient adjustment, refining, and casting. Through utilizing the waste package aluminum alloys and the waste
(Continued)

aluminum pop-top cans to adjust the ingredients, the waste aircraft aluminum alloys would be recycled at a lower cost without downgrading. The present invention has some advantages, such as low cost, and applicability for industrial production, as well as prominent economic benefit.

20 Claims, 1 Drawing Sheet

(51) Int. Cl.
- *B22D 21/00* (2006.01)
- *B22D 43/00* (2006.01)
- *C22B 21/00* (2006.01)
- *C22B 21/06* (2006.01)
- *C22C 1/03* (2006.01)

(52) U.S. Cl.
CPC ...... *C22B 21/0007* (2013.01); *C22B 21/0092* (2013.01); *C22B 21/066* (2013.01); *C22C 1/03* (2013.01)

(56) References Cited

U.S. PATENT DOCUMENTS

| | | | |
|---|---|---|---|
| 2009/0285716 A1 | 11/2009 | Verdier et al. | |
| 2021/0095360 A1 | 4/2021 | Zhang et al. | |
| 2021/0269893 A1* | 9/2021 | Sun | C22C 21/16 |

FOREIGN PATENT DOCUMENTS

| | | |
|---|---|---|
| CA | 3071708 A1 | 3/2019 |
| CN | 101473053 A | 7/2009 |
| CN | 102319890 A | 1/2012 |
| CN | 102912140 A | 2/2013 |
| CN | 103173622 A | 6/2013 |
| CN | 105441746 A | 3/2016 |
| EP | 3684956 A1 | 7/2020 |
| JP | 2000239757 A | 5/2000 |
| JP | 2000239757 A | 2/2002 |
| JP | 2009541585 A | 11/2009 |
| WO | 2009030987 A2 | 3/2009 |
| WO | 2014015539 A1 | 1/2014 |
| WO | 2019057057 A1 | 3/2019 |

OTHER PUBLICATIONS

Stefano Capuzzi et al: "Preparation and Melting of Scrap in Aluminum Recycling: A REview", METALS, vol. 8, No. 4, Apr. 8, 2018 (Apr. 8, 2018), p. 249.

S. Bell et al: "Final Report on Refining Technologies of Aluminum", Jan. 1, 2003 (Jan. 1, 2003), Retrieved from the Internet: URL: https://www.researchgate.net/publication/306292489_Final_Report_on_Refining_Technologies_of_Aluminum.

European Patent Office, Extended Search Report for Application 18859925.2-1103/3684956 PCT/CN2018106424, dated Nov. 12, 2020.

Japanese Office Action for Application No. 2020-529806 dated Mar. 15, 2021.

Tetsu-to-Hagane, 1989, vol. 75, No. 10, pp. 1829-1838.

Innovation, Science and Economic Development Canada Requisition by the Examiner for Application No. 3071708 dated Apr. 29, 2021.

Davis S. B. B. et al., "Final Report on Refining Technologies of Aluminum", pp. 1-12, https://www.researchgate.net/publication/306292489_Final_Report_on_Refining_Technologies_of_Aluminum, Dec. 2003.

Brazilian Patent and Trademark Office, Office Action for Application BR112020001012-0 dated Jul. 5, 2022.

* cited by examiner

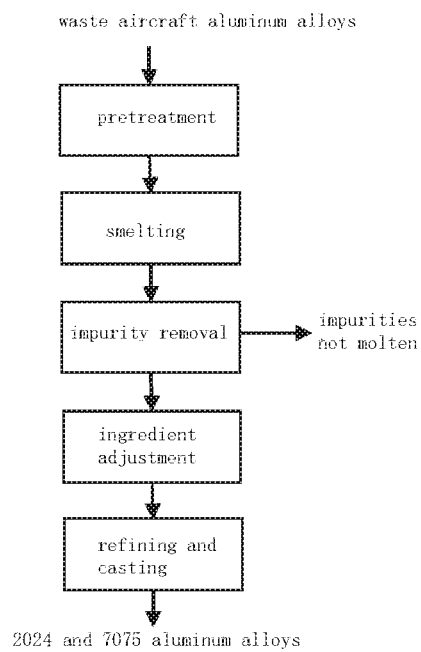

METHODS FOR PRODUCING 2024 AND 7075 ALUMINUM ALLOYS BY RECYCLING WASTE AIRCRAFT ALUMINUM ALLOYS

TECHNICAL FIELD

The invention provides methods for producing 2024 and 7075 aluminum alloys by recycling waste aircraft aluminum alloys, which belong to be technologies for circular economy, and particularly relates to methods for recycling waste aircraft aluminum alloys without downgrading.

BACKGROUND ART

According to the prediction from Aircraft Fleet Recycling Association (AFRA), 6000-8000 aircrafts will be decommissioned in the next 10-20 years. The waste aircrafts contain a great amount of aluminum alloys. For example, the aluminum alloys used in a civil aircraft constitutes about 70% of the total weight, and mainly comprise 2XXX and 7XXX series of aluminum alloys. During long-term placement of the waste aircrafts, the degradation of aluminum alloys would be caused by ultraviolet ray, rainfall, oxidation, and the like, while the environmental issues, such as soil and groundwater pollution, and occupation of massive land resources, will be raised as well. Therefore, recycling of waste aircraft aluminum alloys not only saves energy, but also protects the environment, and would have good economic benefits. The main problem in regenerating 2024 and 7075 aluminum alloys from the waste aircraft aluminum alloys is that: the waste aircraft aluminum alloys contain a large number of riveting components, it is difficult to separate different designations of aluminum alloys from other impurities by sorting; the waste aircraft aluminum alloys contain various alloy elements having high contents, thereby dilution of excessive elements is usually performed by adding a plenty of pure aluminum in the smelting process, leading to a significant increased production cost.

Chinese patent ZL200780023435.6 discloses a process for manufacturing an aluminium-based remelted block intended for producing an aluminum alloy for the aeronautical industry. This method utilizes fractional crystallization to purify the waste aeronautical aluminum alloy melt, which can effectively remove impurities, such as iron and silicon in the aluminum melt, and has a less impact on other alloy elements. However, the method has a very high requirement for the equipment and a higher production cost. Chinese Patent ZL201310018088.5 discloses a method for obtaining a target aluminum alloy by subjecting waste miscellaneous aluminums as raw materials to iron removal by magnetic separation, pretreatment, smelting, molten liquid ingredient assay, calculation, proportioning, and ingredient adjustment. During the process of ingredient adjustment, pure aluminum is added to adjust the elements exceeding the upper limit of range of the target alloy ingredient, which has a disadvantage of higher production cost. Chinese patent ZL201010190753.5 discloses an aluminum alloy ingot having high performance and homogeneity and the method for producing the same, which can effectively remove the non-metallic materials in the waste aluminum materials and reduce the slag produced in the smelting process. However, this method does not relate to proportioning aluminum alloy ingredients.

As described above, the existing techniques for recycling waste aircraft aluminum alloys have some issues to varying degrees, such as higher production cost, incomplete ingredient adjustment, use of aluminum alloy products by downgrading, and the like, and there is an urgent need to develop a technique for recycling waste aircraft aluminum alloys without downgrading.

SUMMARY OF THE DISCLOSURE

The present invention provides a method for producing 2024 and 7075 aluminum alloys by recycling waste aircraft aluminum alloys with respect to the problems encountered in proportioning ingredients in the current processes of recycling waste aircraft aluminum alloys. The particular steps are as follows:

(1) pretreatment: subjecting the waste aircraft aluminum alloys to breaking, iron removal by magnetic separation, removal of heavy metals by flotation, removal of polymers and composite materials by air elutriation, removal of glass by eddy current sorting, and the like;

(2) smelting: smelting the pretreated waste aircraft aluminum alloys till complete melting at a smelting temperature from 700° C. to 800° C.;

(3) impurity removal: purifying the aluminum liquid using foam ceramic filter plate having a pore diameter of 10 ppi to separate the impurities not molten in the aluminum liquid;

(4) ingredient adjustment: testing the ingredients in the aluminum liquid, and comparing them with target aluminum alloy ingredients; and adjusting the ingredients in the aluminum liquid using the other waste aluminum alloys and the interalloys, till the ingredients of the aluminum liquid meet the requirement for the target aluminum alloy ingredients;

(5) filtration: purifying the aluminum liquid using foam ceramic filter plate having a pore diameter of 20 ppi to separate the impurities not molten in the aluminum liquid;

(6) refining and purification: refining the aluminum liquid by adding a refining agent and a degasifier, and placing the refined aluminum liquid for a period; and then purifying the aluminum liquid twice using foam ceramic filter plates having pore diameters of 40 ppi and 60 ppi to separate the substances not molten in the aluminum liquid, respectively;

(7) casting: after refining and removing impurities, casting the aluminum liquid to obtain the aluminum alloys with target ingredients.

The present invention has some advantages in that: the ingredients of the waste aircraft aluminum alloy melt are adjusted using paint-removed waste aluminum pop-top cans and the waste package aluminum alloys, which can significantly reduce the production cost and is beneficial for the industrial application.

BRIEF DESCRIPTION OF THE DRAWINGS

FIG. 1. Flow Chart of the process for recycling waste aircraft aluminum alloys.

DETAILED DESCRIPTION OF PREFERRED EMBODIMENTS

The present invention will now be further described in detail with reference to the following Examples, but it is not limited to the following Examples.

Example 1

Production of 7075 Aluminum Alloy by Recycling Waste Aircraft Aluminum Alloys (1) pretreatment: the waste aircraft aluminum alloys are subjected to breaking, iron removal by magnetic separation, removal of heavy metals by flotation, removal of polymers and composite materials by air elutriation, removal of glass by eddy current sorting, and the like;

(2) smelting: the pretreated waste aircraft aluminum alloys are smelt till complete melting at a smelting temperature of 700° C.;

(3) impurity removal: the aluminum liquid is purified using foam ceramic filter plate having a pore diameter of 10 ppi to separate the impurities not molten in the aluminum liquid;

(4) ingredient adjustment: after the removal of impurities, two samples are taken from different parts of the aluminum melt for the ingredient assay.

The ingredients in the standard 7075 aluminum alloy, the waste package aluminum alloys as ingredient adjustment agents, and the aluminum melt upon the impurity removal in "GB/T3190-2008 deformation aluminum and aluminum alloy ingredients" are shown in Table 1.

(5) filtration: the aluminum liquid is purified using foam ceramic filter plate having a pore diameter of 20 ppi to separate the impurities not molten in the aluminum liquid;

(6) refining and purification: the aluminum liquid is refined by adding a refining agent and a degasifier, and the refined aluminum liquid is placed for a period; the aluminum liquid is then purified twice using foam ceramic filter plates having pore diameters of 40 ppi and 60 ppi to separate the substances not molten in the aluminum liquid, respectively.

(7) casting: after refining and removing impurities, the aluminum liquid is casted to obtain the 7075 aluminum alloy ingot.

Example 2

Production of 2024 Aluminum Alloy by Recycling Waste Aircraft Aluminum Alloys (1) pretreatment: the waste aircraft aluminum alloys are subjected to breaking, iron removal by magnetic separation, removal of heavy metals by flotation, removal of polymers and composite materials by air elutriation, removal of glass by eddy current sorting, and the like;

TABLE 1

Table for the comparison of the aluminum alloy ingredients prior to ingredient proportioning and the 7075 aluminum alloy ingredients

|  | Cu | Zn | Mg | Mn | Cr | Si | Fe | Ti |
|---|---|---|---|---|---|---|---|---|
| Standard 7075 aluminum alloy | 1.2-2.0 | 5.1-6.1 | 2.1-2.9 | <0.3 | 0.18-0.3 | <0.4 | <0.5 | <0.2 |
| Waste package aluminum alloys | <0.15 | <0.25 | 4.0-5.0 | 0.2-0.5 | <0.10 | <0.20 | <0.35 | <0.10 |
| Melt ingredients | 2.378 | 2.385 | 1.286 | 0.325 | 0.078 | 0.26 | 0.227 | 0.027 |

Through the comparison of the aluminum alloy melt ingredients prior to ingredient adjustment and the standard 7075 aluminum alloy ingredients, it can be seen that the contents of Cu and Mn are excessive, while the contents of Zn, Mg, and Cr are insufficient. After calculation, 25% the paint-removed waste package aluminum alloys, 1.6% aluminum-chromium alloy, 3.5% metallic zinc and 1% aluminum-magnesium alloy are added into the melt, and well stirred. After the added materials are completely molten, two samples are taken from different parts of the aluminum melt for the ingredient assay. The comparison of adjusted aluminum melt ingredients and the standard 7075 aluminum alloy ingredients is shown in Table 2, and then the aluminum melt ingredients have already met the requirements for the standard 7075 aluminum alloy.

(2) smelting: the pretreated waste aircraft aluminum alloys are smelt till complete melting at a smelting temperature of 800° C.;

(3) impurity removal: the aluminum liquid is purified using foam ceramic filter plate having a pore diameter of 10 ppi to separate the impurities not molten in the aluminum liquid;

(4) ingredient adjustment: after the removal of impurities, two samples are taken from different parts of the aluminum melt for the ingredient assay.

The ingredients in the standard 2024 aluminum alloy, the waste aluminum pop-top cans as ingredient adjustment agents, and the aluminum melt upon the impurity removal in "GB/T3190-2008 deformation aluminum and aluminum alloy ingredients" are shown in Table 3.

TABLE 2

Table for the comparison of the melt ingredients upon adjustment and the standard 7075 alloy ingredients

|  | Cu | Zn | Mg | Mn | Cr | Si | Fe | Ti |
|---|---|---|---|---|---|---|---|---|
| Standard 7075 aluminum alloy | 1.2-2.0 | 5.1-6.1 | 2.1-2.9 | <0.3 | 0.18-0.3 | <0.4 | <0.5 | <0.2 |
| Melt ingredients | 1.622 | 5.584 | 2.498 | 0.272 | 0.238 | 0.22 | 0.263 | 0.019 |

TABLE 3

Table for the comparison of the aluminum alloy ingredients prior to
ingredient proportioning and the 2024 aluminum alloy ingredients

|  | Cu | Zn | Mg | Mn | Cr | Si | Fe | Ti |
|---|---|---|---|---|---|---|---|---|
| Standard 2024 aluminum alloy | 3.8-4.9 | <0.25 | 1.2-1.8 | 0.3-0.9 | <0.1 | <0.5 | <0.5 | <0.15 |
| the waste aluminum pop-top cans | 0.05-0.25 | <0.25 | 0.8-1.3 | 0.8-1.4 | — | <0.60 | <0.80 | <0.10 |
| Melt ingredients | 3.752 | 1.543 | 1.368 | 0.532 | 0.043 | 0.20 | 0.213 | 0.028 |

Through the comparison of the aluminum alloy melt ingredients prior to ingredient adjustment and the standard 2024 aluminum alloy ingredients, it can be seen that the content of Zn is excessive, while the content of Cu is insufficient. After calculation, 650% paint-removed waste aluminum pop-top can sheets, 1.6% aluminum-chromium alloy, 22.5% metallic copper and 10% aluminum-magnesium alloy are added into the melt, and well stirred. After the added materials are completely molten, two samples are taken from different parts of the aluminum melt for the ingredient assay. The comparison of adjusted aluminum melt ingredients and the standard 2024 aluminum alloy ingredients is shown in Table 4, and then the aluminum melt ingredients have already met the requirements for the standard 2024 aluminum alloy.

TABLE 4

Table for the comparison of the melt ingredients upon
adjustment and the standard 2024 alloy ingredients

|  | Cu | Zn | Mg | Mn | Cr | Si | Fe | Ti |
|---|---|---|---|---|---|---|---|---|
| Standard 2024 aluminum alloy | 3.8-4.9 | <0.25 | 1.2-1.8 | 0.3-0.9 | <0.1 | <0.5 | <0.5 | <0.15 |
| Melt ingredients | 4.298 | 0.224 | 1.512 | 0.638 | 0.032 | 0.23 | 0.403 | 0.032 |

(5) filtration: the aluminum liquid is purified using foam ceramic filter plate having a pore diameter of 20 ppi to separate the impurities not molten in the aluminum liquid;

(6) refining and purification: the aluminum liquid is refined by adding a refining agent and a degasifier, and the refined aluminum liquid is placed for a period; the aluminum liquid is then purified twice using foam ceramic filter plates having pore diameters of 40 ppi and 60 ppi to separate the substances not molten in the aluminum liquid, respectively.

(7) casting: after refining and removing impurities, the aluminum liquid is casted to obtain the 2024 aluminum alloy ingot.

Example 3

Production of 7075 Aluminum Alloy by Recycling Waste Aircraft Aluminum Alloys (1) pretreatment: the waste aircraft aluminum alloys are subjected to breaking, iron removal by magnetic separation, removal of heavy metals by flotation, removal of polymers and composite materials by air elutriation, removal of glass by eddy current sorting, and the like;

(2) smelting: the pretreated waste aircraft aluminum alloys are smelt till complete melting at a smelting temperature of 750° C.;

(3) impurity removal: the aluminum liquid is purified using foam ceramic filter plate having a pore diameter of 10 ppi to separate the impurities not molten in the aluminum liquid;

(4) ingredient adjustment: after the removal of impurities, two samples are taken from different parts of the aluminum melt for the ingredient assay.

The ingredients in the standard 7075 aluminum alloy, the waste package aluminum alloys as ingredient adjustment agents, and the aluminum melt upon the impurity removal in "GB/T3190-2008 deformation aluminum and aluminum alloy ingredients" are shown in Table 5.

TABLE 5

Table for the comparison of the aluminum alloy ingredients prior to
ingredient proportioning and the 7075 aluminum alloy ingredients

|  | Cu | Zn | Mg | Mn | Cr | Si | Fe | Ti |
|---|---|---|---|---|---|---|---|---|
| Standard 7075 aluminum alloy | 1.2-2.0 | 5.1-6.1 | 2.1-2.9 | <0.3 | 0.18-0.3 | <0.4 | <0.5 | <0.2 |
| Melt ingredients | 2.138 | 3.012 | 1.375 | 0.295 | 0.094 | 0.25 | 0.245 | 0.025 |
| Waste package aluminum alloys | <0.15 | <0.25 | 4.0-5.0 | <0.15 | <0.15 | <0.20 | <0.35 | <0.10 |

Through the comparison of the aluminum alloy melt ingredients prior to ingredient adjustment and the standard 7075 aluminum alloy ingredients, it can be seen that the contents of Cu and Mn are excessive, while the contents of Zn, Mg, and Cr are insufficient. After calculation, 25% the paint-removed waste package aluminum alloys, 2% aluminum-chromium alloy, 4% metallic zinc and 1% aluminum-magnesium alloy are added into the melt, and well stirred. After the added materials are completely molten, two samples are taken from different parts of the aluminum melt for the ingredient assay. The comparison of adjusted aluminum melt ingredients and the standard 7075 aluminum alloy ingredients is shown in Table 6, and then the aluminum melt ingredients have already met the requirements for the standard 7075 aluminum alloy.

TABLE 6

Table for the comparison of the melt ingredients upon adjustment and the standard 7075 alloy ingredients

|  | Cu | Zn | Mg | Mn | Cr | Si | Fe | Ti |
|---|---|---|---|---|---|---|---|---|
| Standard 7075 aluminum alloy | 1.2-2.0 | 5.1-6.1 | 2.1-2.9 | <0.3 | 0.18-0.3 | <0.4 | <0.5 | <0.2 |
| Melt ingredients | 1.596 | 5.828 | 2.597 | 0.268 | 0.257 | 0.25 | 0.295 | 0.021 |

(5) filtration: the aluminum liquid is purified using foam ceramic filter plate having a pore diameter of 20 ppi to separate the impurities not molten in the aluminum liquid;

(6) refining and purification: the aluminum liquid is refined by adding a refining agent and a degasifier, and the refined aluminum liquid is placed for a period; the aluminum liquid is then purified twice using foam ceramic filter plates having pore diameters of 40 ppi and 60 ppi to separate the substances not molten in the aluminum liquid, respectively.

(7) casting: after refining and removing impurities, the aluminum liquid is casted to obtain the 7075 aluminum alloy ingot.

Example 4

Production of 2024 Aluminum Alloy by Recycling Waste Aircraft Aluminum Alloys (1) pretreatment: the waste aircraft aluminum alloys are subjected to breaking, iron removal by magnetic separation, removal of heavy metals by flotation, removal of polymers and composite materials by air elutriation, removal of glass by eddy current sorting, and the like;

(2) smelting: the pretreated waste aircraft aluminum alloys are smelt till complete melting at a smelting temperature of 750° C.;

(3) impurity removal: the aluminum liquid is purified using foam ceramic filter plate having a pore diameter of 10 ppi to separate the impurities not molten in the aluminum liquid;

(4) ingredient adjustment: after the removal of impurities, two samples are taken from different parts of the aluminum melt for the ingredient assay.

The ingredients in the standard 2024 aluminum alloy, the waste aluminum pop-top cans as ingredient adjustment agents, and the aluminum melt upon the impurity removal in "GB/T3190-2008 deformation aluminum and aluminum alloy ingredients" are shown in Table 7.

TABLE 7

Table for the comparison of the aluminum alloy ingredients prior to ingredient proportioning and the 2024 aluminum alloy ingredients

|  | Cu | Zn | Mg | Mn | Cr | Si | Fe | Ti |
|---|---|---|---|---|---|---|---|---|
| Standard 2024 aluminum alloy | 3.8-4.9 | <0.25 | 1.2-1.8 | 0.3-0.9 | <0.1 | <0.5 | <0.5 | <0.15 |
| the aluminum waste pop-top cans | <0.25 | <0.25 | 0.8-1.3 | 1.0-1.5 | — | <0.30 | <0.70 | <0.10 |
| Melt ingredients | 4.312 | 0.22 | 1.498 | 0.641 | 0.036 | 0.20 | 0.385 | 0.028 |

Through the comparison of the aluminum alloy melt ingredients and the standard 2024 aluminum alloy ingredients prior to ingredient adjustment, it can be seen that the content of Zn is excessive, while the content of Cu is insufficient. After calculation, 650% paint-removed waste aluminum pop-top can sheets, 1.5% aluminum-chromium alloy, 23% metallic copper and 10% aluminum-magnesium alloy are added into the melt, and well stirred. After the added materials are completely molten, two samples are taken from different parts of the aluminum melt for the ingredient assay. The comparison of adjusted aluminum melt ingredients and the standard 2024 aluminum alloy ingredients is shown in Table 8, and then the aluminum melt ingredients have already met the requirements for the standard 2024 aluminum alloy.

TABLE 8

Table for the comparison of the melt ingredients upon adjustment and the standard 2024 alloy ingredients

|  | Cu | Zn | Mg | Mn | Cr | Si | Fe | Ti |
|---|---|---|---|---|---|---|---|---|
| 2024 aluminum alloy | 3.8-4.9 | <0.25 | 1.2-1.8 | 0.3-0.9 | <0.1 | <0.5 | <0.5 | <0.15 |
| Melt ingredients | 4.312 | 0.22 | 1.498 | 0.641 | 0.036 | 0.20 | 0.385 | 0.028 |

(5) filtration: the aluminum liquid is purified using foam ceramic filter plate having a pore diameter of 20 ppi to separate the impurities not molten in the aluminum liquid;

(6) refining and purification: the aluminum liquid is refined by adding a refining agent and a degasifier, and the refined aluminum liquid is placed for a period; the aluminum liquid is then purified twice using foam ceramic filter plates having pore diameters of 40 ppi and 60 ppi to separate the substances not molten in the aluminum liquid, respectively.

(7) casting: after refining and removing impurities, the aluminum liquid is casted to obtain the 2024 aluminum alloy ingot.

The invention claimed is:

1. A method for producing 2024 and 7075 aluminum alloys by recycling waste aircraft aluminum alloys, comprising:
   subjecting the waste aircraft aluminum alloys to a pretreatment by removing polymers and composite materials by air elutriation;
   smelting the pretreated waste aircraft aluminum alloys until complete melting at a smelting temperature of 700° C. to 800° C.;
   purifying aluminum liquid using a foam ceramic filter plate having a pore diameter of 10 ppi to separate the impurities not molten in the aluminum liquid, wherein the impurities not molten in the aluminum comprise carbon fiber;
   testing the ingredients in the aluminum liquid, and comparing the ingredients with target aluminum alloy ingredients; and adjusting the ingredients in the aluminum liquid using other waste aluminum alloys and interalloys;
   purifying the aluminum liquid using a foam ceramic filter plate having a pore diameter of 20 ppi to separate the impurities not molten in the aluminum liquid;
   refining the aluminum liquid by adding a refining agent and a degasifier to form a refined aluminum liquid; and then purifying the refined aluminum liquid twice using foam ceramic filter plates having pore diameters of 40 ppi and 60 ppi, respectively, to separate substances not molten in the refined aluminum liquid; and
   casting the refined aluminum liquid to obtain the aluminum alloys with target ingredients.

2. The method for producing 2024 and 7075 aluminum alloys by recycling waste aircraft aluminum alloys according to claim 1, characterized in that: the other waste aluminum alloys comprise paint-removed waste aluminum pop-top cans and waste package aluminum alloys.

3. The method for producing 2024 and 7075 aluminum alloys by recycling waste aircraft aluminum alloys according to claim 1, characterized in that: filtered substances not molten while purifying the refined aluminum liquid using the foam ceramic filter plate having pore diameter of 60 ppi are waste aircraft aluminum alloy raw materials and inorganic coating materials adhered on the waste aluminum alloy raw materials.

4. The method for producing 2024 and 7075 aluminum alloys by recycling waste aircraft aluminum alloys according to claim 1, wherein the pretreatment of waste aircraft aluminum alloys further comprises breaking.

5. The method for producing 2024 and 7075 aluminum alloys by recycling waste aircraft aluminum alloys according to claim 1, wherein the pretreatment of waste aircraft aluminum alloys further comprises iron removal by magnetic separation.

6. The method for producing 2024 and 7075 aluminum alloys by recycling waste aircraft aluminum alloys according to claim 1, wherein the pretreatment of waste aircraft aluminum alloys further comprises removal of heavy metals by flotation.

7. The method for producing 2024 and 7075 aluminum alloys by recycling waste aircraft aluminum alloys according to claim 1, wherein the pretreatment of waste aircraft aluminum alloys further comprises removal of glass by eddy current sorting.

8. The method for producing 2024 and 7075 aluminum alloys by recycling waste aircraft aluminum alloys according to claim 1, wherein the pretreated waste aircraft aluminum alloys are smelted at a temperature of about 750° C.

9. A method, comprising:
   collecting raw materials comprising waste aircraft aluminum alloys;
   pretreating the waste aluminum aircraft raw materials by removing polymers and composite materials by air elutriation;
   smelting the pretreated waste aluminum aircraft raw materials to a liquid state;
   filtering the liquid to remove solid carbon fiber impurities using a foam ceramic filter plate;
   assaying the filtered liquid to determine the elemental composition of the melt;
   adjusting the metal element content of the melt through addition of aluminum alloys;

filtering, refining, and purifying the adjusted melt by using a first foam ceramic filter plate, a refining agent, and a degasifier;

repeating filtering the adjusted melt by using a second foam ceramic filter plate having pores having a diameter smaller than a diameter of pores of the first foam ceramic filter plate; and casting the purified liquid alloy to obtain aluminum alloy ingots.

10. The method of claim 9, wherein the aluminum alloy is a 7075 aluminum alloy comprising Cu, Zn, Mg, Mn, Cr, Si, Fe, Ti, or combination(s) thereof.

11. The method of claim 9, wherein the aluminum alloy is a 2024 aluminum alloy comprising Cu, Zn, Mg, Mn, Cr, Si, Fe, Ti, or combination(s) thereof.

12. The method of claim 9, wherein the pretreated waste aluminum aircraft raw materials are smelted at a temperature of about 700° C. to about 800° C.

13. The method of claim 9, wherein the pretreated waste aluminum aircraft raw materials are smelted at a temperature of about 750° C.

14. The method of claim 9, wherein the metal element content is adjusted by adding paint-removed waste aluminum pop-top cans or waste package aluminum alloys.

15. The method of claim 9, wherein the foam ceramic filter plate has a pore diameter of about 10 ppi to about 60 ppi.

16. The method of claim 1, wherein the aluminum alloys comprise an element selected from the group consisting of Cu, Zn, Mg, Mn, Cr, Si, Fe, Ti, and combinations thereof.

17. The method of claim 14, wherein the metal element content is adjusted by adding paint-removed waste aluminum pop-top cans.

18. The method of claim 14, wherein the metal element content is adjusted by adding waste package aluminum alloys.

19. The method of claim 15, wherein the foam ceramic filter plate has a pore diameter of about 20 ppi to about 60 ppi.

20. The method of claim 19, wherein the foam ceramic filter plate has a pore diameter of about 40 ppi to about 60 ppi.

* * * * *